United States Patent
Bull et al.

(10) Patent No.: US 12,099,809 B2
(45) Date of Patent: Sep. 24, 2024

(54) CONCEPT DISAMBIGUATION FOR NATURAL LANGUAGE PROCESSING

(71) Applicant: International Business Machines Corporation, Armonk, NY (US)

(72) Inventors: Brendan Bull, Durham, NC (US);
Scott Carrier, New Hill, NC (US);
Paul Lewis Felt, Springville, UT (US);
Dwi Sianto Mansjur, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 303 days.

(21) Appl. No.: 16/892,449

(22) Filed: Jun. 4, 2020

(65) Prior Publication Data

US 2021/0383072 A1    Dec. 9, 2021

(51) Int. Cl.
G06F 40/35  (2020.01)
G06N 7/01  (2023.01)
G06N 20/00  (2019.01)

(52) U.S. Cl.
CPC .............. *G06F 40/35* (2020.01); *G06N 7/01* (2023.01); *G06N 20/00* (2019.01)

(58) Field of Classification Search
CPC ......... G06F 40/35; G06N 20/00; G06N 7/005
See application file for complete search history.

(56) References Cited

U.S. PATENT DOCUMENTS

| | | | |
|---|---|---|---|
| 7,260,571 B2 | 8/2007 | Amitay et al. | |
| 8,364,672 B2 | 1/2013 | Ahn et al. | |
| 9,348,902 B2 | 5/2016 | Garera et al. | |
| 11,281,736 B1* | 3/2022 | Kurup | G06Q 30/0633 |
| 2014/0122495 A1 | 5/2014 | Kawai et al. | |
| 2016/0104074 A1 | 4/2016 | Shekhawat et al. | |
| 2017/0205888 A1* | 7/2017 | Nicholson | G06F 3/04883 |

(Continued)

FOREIGN PATENT DOCUMENTS

| CN | 101989128 A | 3/2011 |
|---|---|---|
| CN | 106407180 A | 2/2017 |

OTHER PUBLICATIONS

International Search Report; International Application No. PCT/IB2021/054317 ; International Filing Date: May 19, 2021; Date of mailing Sep. 6, 2021: pp. 10.

(Continued)

*Primary Examiner* — Rasha S Al Aubaidi
(74) *Attorney, Agent, or Firm* — Cantor Colburn LLP; Kelsey M. Skodje

(57) ABSTRACT

Techniques for concept disambiguation for natural language processing are described herein. An aspect includes receiving a message from a user. Another aspect includes identifying an ambiguous concept in the message. Another aspect includes determining a plurality of concept candidates corresponding to the ambiguous concept. Another aspect includes determining, for each of the plurality of concept candidates, a respective similarity score based on user-specific concept metrics corresponding to the user. Another aspect includes ranking the plurality of concept candidates based on the respective similarity scores. Another aspect includes determining that the ambiguous concept corresponds to a top-ranked concept candidate of the ranked plurality of concept candidates.

14 Claims, 10 Drawing Sheets

(56) References Cited

U.S. PATENT DOCUMENTS

2018/0176163 A1* 6/2018 Arquero ............... G06F 40/30
2019/0199656 A1* 6/2019 Foerster ............... G06N 20/00

OTHER PUBLICATIONS

Banerjee et al., "Extended Gloss Overlaps as a Measure of Semantic Relatedness," Natural Language, Ijcai. vol. 3, 2003, pp. 805-810.
Hoffart et al. "Robust Disambiguation of Named Entities in Text." Proceedings of the Conference on Empirical Methods in Natural Language Processing, Association for Computational Linguistics, Jul. 2011, pp. 782-792.
Klavans et al. "Computational Linguistics for Metadata Building (CLIMB) Text Mining for the Automatic Extraction of Subject Terms for Image Metadata," Proceedings of the 1st International Workshop on Metadata Mining for Image Understanding, MMIU 2008, 10 pages.
Navigli et al., "Learning Domain Ontologies from Document Warehouses and Dedicated Web Sites," Association for Computational Linguistics 30.2, 2004, pp. 151-179.
Pilz et al., "Collective Search for Concept Disambiguation," Proceedings of COLING 2012: Technical Papers, Dec. 2012, pp. 2243-2258.

* cited by examiner

CONCEPT DISAMBIGUATION FOR NATURAL LANGUAGE PROCESSING

BACKGROUND

The present, invention generally relates to programmable computers, and more specifically, to concept disambiguation for natural language processing by a programmable computer.

Natural language processing (NLP) is a field of computer science, artificial intelligence, and linguistics concerned with the interactions between computers and human (natural) languages. As such, NLP is related to the area of human-computer interaction. Many challenges in NLP involve natural language understanding, i.e. enabling computers to derive meaning from human or natural language input.

Modern NLP algorithms are based on machine learning, especially statistical machine learning. The paradigm of machine learning is different from that of most prior attempts at language processing. Prior implementations of language-processing tasks typically involved the direct hand coding of large sets of rules whereas the machine-learning paradigm calls instead for using general learning algorithms (often, although not always, grounded in statistical inference) to automatically learn such rules through the analysis of large corpora of typical real-world examples. A corpus (plural, "corpora") is a set of documents (or sometimes, individual sentences) that have been hand-annotated with the correct values to be learned.

Many different classes of machine learning algorithms have been applied to NLP tasks. These algorithms take as input a large set of "features" that are generated from the input data. Some of the earliest-used algorithms, such as decision trees, produced systems of hard if-then rules similar to the systems of hand-written rules that were then common. Increasingly, however, research has focused on statistical models, which make soft, probabilistic decisions based on attaching real-valued weights to each input feature. Such models have the advantage that they can express the relative certainty of many different possible answers rather than only one, producing more reliable results when such a model is included as a component of a larger system.

One type of NLP system is a search engine, such as an Internet search engine, e.g., Google™, Yahoo!™, or the like. Such search systems receive one or more terms and search a corpus of content for matching terms and return results indicating the sources of content having the specified terms. In some instances, more advanced processing of search terms is performed which includes the implementation of NLP algorithms to improve the results generated by the search engine.

Another type of NLP system is a Question and Answer (QA) system which receives an input question, analyzes the input question using NLP algorithms, and returns results indicative of the most probable answer to the input question. QA systems provide automated mechanisms for searching through large sets of sources of content, e.g., electronic documents, and analyze them with regard to an input question to determine an answer to the question and a confidence measure as to how accurate an answer is for answering the Input question.

One such QA system is the IBM Watson™ system available from International Business Machines (IBM) Corporation of Armonk, N.Y. The IBM Watson™ system is an application of advanced natural language processing, information retrieval, knowledge representation and reasoning, and machine learning technologies to the field of open domain question answering. The IBM Watson™ system is built on IBMs DeepQA™ technology used for hypothesis generation, massive evidence gathering, analysts, and scoring. DeepQA™ takes an input question, analyzes it, decomposes the question into constituent parts, generates one or more hypothesis based on the decomposed question and results of a primary search of answer sources, performs hypothesis and evidence scoring based on retrieval of evidence from evidence sources, performs synthesis of the one or more hypothesis, and based on trained models, performs a final merging and ranking to output an answer to the input question along with a confidence measure.

SUMMARY

Embodiments of the present invention are directed to concept disambiguation for natural language processing. A non-limiting example computer-implemented method includes receiving, by a processor, a message from a user. The method also includes identifying an ambiguous concept in the message. The method also includes determining a plurality of concept candidates corresponding to the ambiguous concept. The method also includes determining, for each of the plurality of concept candidates, a respective similarity score based on user-specific concept metrics corresponding to the user. The method also includes ranking the plurality of concept candidates based on the respective similarity scores. The method also includes determining that the ambiguous concept corresponds to a top-ranked concept candidate of the ranked plurality of concept candidates.

A non-limiting example system includes a memory having computer readable instructions, and one or more processors for executing the computer readable instructions, the computer readable instructions controlling the one or more processors to perform operations including receiving a message from a user. The operations also include identifying an ambiguous concept in the message. The operations also include determining a plurality of concept candidates corresponding to the ambiguous concept. The operations also include determining, for each of the plurality of concept candidates, a respective similarity score based on user-specific concept metrics corresponding to the user. The operations also include ranking the plurality of concept candidates based on the respective similarity scores. The operations also include determining that the ambiguous concept corresponds to a top-ranked concept candidate of the ranked plurality of concept candidates.

A non-limiting example computer program product includes a computer readable storage medium having program instructions embodied therewith, the program instructions executable by one or more processors to cause the one or more processors to perform operations including receiving a message from a user. The operations also include identifying an ambiguous concept in the message. The operations also include determining a plurality of concept candidates corresponding to the ambiguous concept. The operations also include determining, for each of the plurality of concept candidates, a respective similarity score based on user-specific concept metrics corresponding to the user. The operations also include ranking the plurality of concept candidates based on the respective similarity scores. The operations also include determining that the ambiguous concept corresponds to a top-ranked concept candidate of the ranked plurality of concept candidates.

A non-limiting example computer-implemented method includes receiving, by a processor, text corresponding to a first user. The method also includes identifying an unambiguous concept in the text corresponding to the first user. The method also includes incrementing a count corresponding to the unambiguous concept in user-specific concept metrics corresponding to the first user.

A non-limiting example system includes a memory having computer readable instructions, and one or more processors for executing the computer readable instructions, the computer readable instructions controlling the one or more processors to perform operations including receiving text corresponding to a first user. The operations also include identifying an unambiguous concept in the text corresponding to the first user. The operations also include incrementing a count corresponding to the unambiguous concept in user-specific concept metrics corresponding to the first user.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

Figure 1:
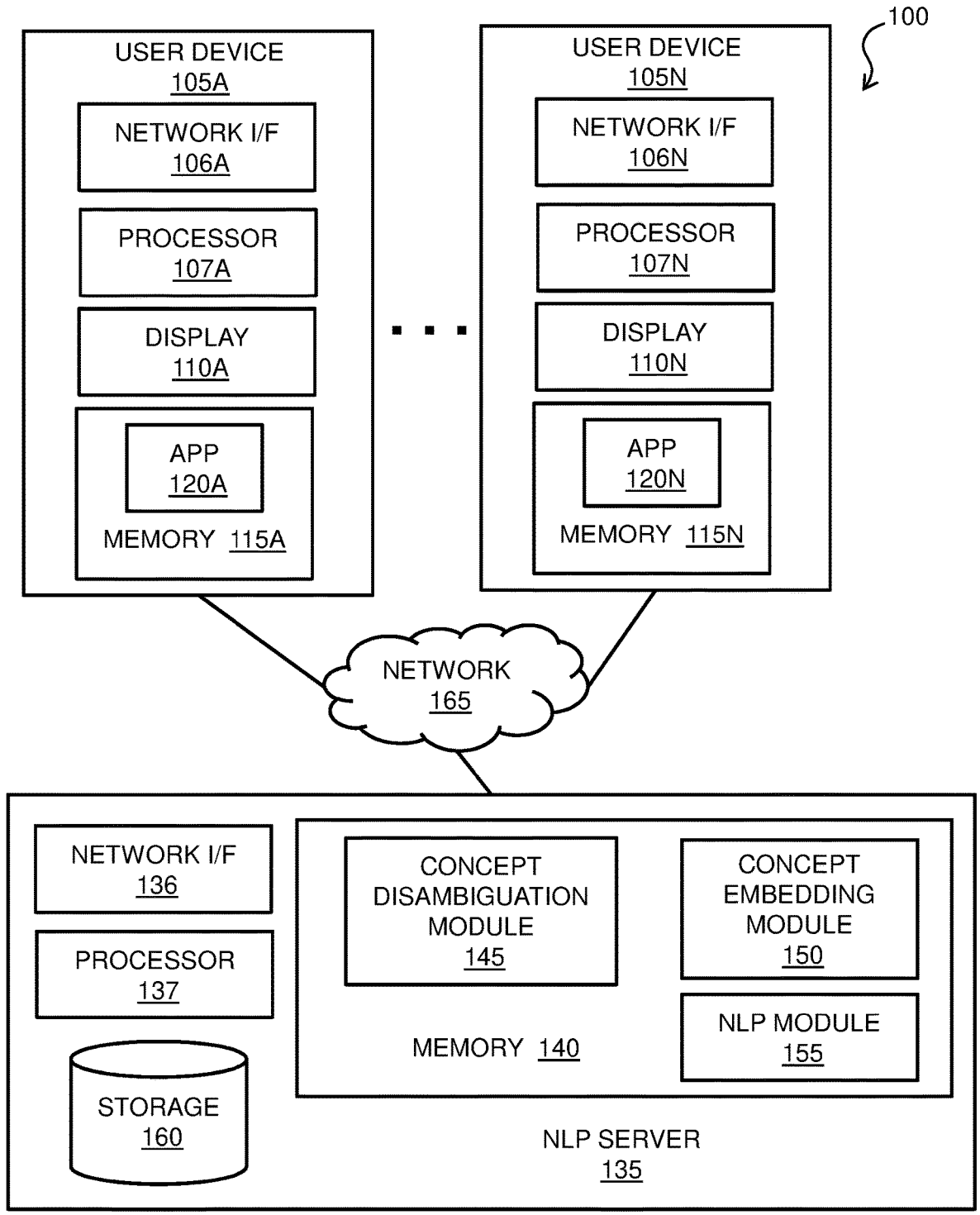
FIG. 1 is a block diagram depicting a computing environment for concept disambiguation for natural language processing in accordance with an embodiment of the present invention.

One or more embodiments of the present invention provide concept disambiguation for natural language processing (NLP). An NLP system can encounter ambiguous concepts, including but not limited to acronyms or words that may have multiple meanings, in messages that are received for processing by the NLP system. Without a sufficient amount of context in the form of collocated concepts (or other external context) in the message such that the meaning of an ambiguous concept is obvious, the NLP system may import, information from another service to aid in disambiguating the text. For example, if the NLP system has access to a patient's history and knows that the patient has had a hip replacement, the NLP system can conclude that the acronym "PT" in a message corresponding to the patient is likely to mean "physical therapy." However, in a clinical context, "PT" may also mean "prothrombin time." The NLP system may not have access to larger context or external context like patient records. Therefore, if the NLP system receives messages, particularly relatively short messages, including ambiguous concepts such as "am I covered for PT" or "show me the patients admitted in the last year with PT", there may not be enough context for the NLP system to correctly determine the meanings of the messages.

User-specific concept metrics quantifying the historical usage of unambiguous concepts by users can be collected and used to help an NLP system perform concept disambiguation. For example, an NLP system can receive multiple instances of text from a particular user regarding insurance, and unambiguous concepts included in the user-specific concept metrics for the user may include less technical language such as "knee replacement surgery" or "bariatric surgery," and not more technical language such as "prothrombin time." For text received from a clinical support application that doctors or nurses use to ask questions, the distribution of concepts included in the user-specific concept metrics corresponding to the clinical support application may be more technical than the metrics of the user that performs insurance-related tasks. When an ambiguous concept is detected in a message by the NLP system, user-specific concept metrics associated with the sending user can be consulted to see if there is evidence from previous messages that should push the disambiguation of the ambiguous concept in one direction over another.

When text is received from a user that includes an unambiguous concept, the unambiguous concept can be stored in user-specific concept metrics (e.g., a data structure) with an associated count. The count can indicate how often that specific user has historically generated text that includes the particular concept. The user-specific concept metrics can be partitioned by tenant, user, application, or any other appropriate system grouping. In some embodiments, each of the unambiguous concepts included in the user-specific metrics can be represented via a dense vector representation.

FIG. 1 is a block diagram depicting a system 100 for concept disambiguation for natural language processing in accordance with an embodiment of the present invention. As depicted, system 100 includes user devices 105A-N and an NLP server 135 that are connected by a network 165. It is to be understood that the functional division among components of system 100 has been chosen for purposes of explaining present invention embodiments and is not to be construed as a limiting example.

User devices 105A-N each include a respective network interface (I/F) 106A-N, at least one processor 107A-N, a display 110A-N, and memory 115A-N. Memories 115A-N may include applications 120A-N. User devices 105A-N may include laptop computers, tablet computers, netbook computers, a personal computer (PC), a desktop computer, a personal digital assistant (PDA), smart phones, thin clients, or any programmable electronic devices capable of executing computer readable program instructions. Network interfaces 106A-N enable components of user devices 105A-N to send and receive data over a network, such as network 165. User devices 105A-N may include internal and external hardware components, as depicted and described in further detail with respect to FIG. 8.

Displays 110A-N may include any electronic device capable of presenting information in a visual form. For example, a display of displays 110A-N may be a liquid crystal display (LCD), a cathode ray tube (CRT) display, a light-emitting diode (LED) display, an electronic ink display, and the like. Information relating to an NLP service hosted on NLP server 135 may be displayed to a user of user devices 105A-N via displays 110A-N.

Applications 120A-N may include one or more modules or units to perform various functions of present invention embodiments described below. Applications 120A-N may be implemented by any combination of any quantity of software and/or hardware modules or units, and may reside within memories 115A-N of user devices 105A-N for execution by a processor, such as processors 107A-N.

Instances of applications 120A-N may enable users of any of user devices 105A-N to send messages (e.g., any appropriate text, including queries) to NLP server 135 for processing by NLP module 155. In some embodiments of the invention, the messages received from user devices 105A-N can be processed by NLP server 135 and used to retrieve information from an information source (e.g., information is stored in storage 160, and/or from an external database that is in communication with NLP server 135 via network 165, in various embodiments of the invention). In response to a processed message, retrieved information can be provided back to the sending user device of user devices 105A-N via applications 120A-N. Applications 120A-N can include a plurality of different applications, each application tailored to a particular type of user. User-specific concept metrics can be collected and maintained, and concept disambiguation performed, based on the type of application used to send generate text or send messages in some embodiments of the invention.

NLP server 135 includes a network interface 136, at least one processor 137, memory 140, and storage 160. Memory 140 includes a concept disambiguation module 145, concept embedding module 150, and a NLP module 155. In various embodiments of the present invention, NLP server 135 may include a laptop computer, a tablet computer, a netbook computer, a personal computer (PC), a desktop computer, a personal digital assistant (PDA), a smart phone, or any programmable electronic device capable of executing computer readable program instructions. Network interface 136 enables components of NLP server 135 to send and receive data over a network, such as network 165, In general, NLP server 135 and its modules may perform concept disambiguation for natural language processing of requests from any of user devices 105A-N. NLP server 135 may include internal and external hardware components, as depicted and described in further detail with respect to FIG. 8.

Concept embedding module 150, concept disambiguation module 145, and NLP module 155 may include one or more modules or units to perform various functions of present invention embodiments described below. Concept embedding module 150, concept disambiguation module 145, and NLP module 155 may be implemented by any combination of any quantity of software and/or hardware modules or units, and may reside within memory 140 of NLP server 135 for execution by a processor, such as processor 137.

Concept embedding module 150 may process an ontology of concepts alone or in combination with data obtained from lexical corpora to generate concept embeddings for a vector space model. In particular, concept embedding module 150 extracts training examples for a concept from neighboring context windows. Each context window may include other concepts that are linked to a selected concept according to the hierarchy of the ontology. For example, training windows for a concept may include one or more parent concepts, one or more child concepts, one or more grandchild concepts, etc. Concept embedding module 150 may generate a vector for each concept in an ontology, and train concept embeddings using the vectors. A hierarchical ontology that is processed by concept embedding module 150 may have any number of concepts that form any number of hierarchical levels. A hierarchical ontology includes concepts and relations between concepts. A hierarchical ontology may include any known or other ontology, such as the UMLS®, Gene Ontology (GO), or Systematized Nomenclature of Medicine-Clinical Terms (SNOMED-CT). The ontology and lexical corpora that are processed by concept embedding module 150 may be stored in any appropriate computer device, including but not limited to storage 160 or a remote database that is in communication with NLP server 135 via network 165. An example of a portion of a hierarchical ontology that may be processed as an input by embodiments of concept embedding module 150 is illustrated with respect to FIG. 4A, and an example of a portion of a concept embedding comprising a concept hierarchy that can be generated as an output by concept embedding module 150 is illustrated with respect to FIG. 4B.

Concept embedding module 150 may perform training on the set of vectors by iteratively adjusting vectors to optimize a loss function. The loss function may calculate a cosine similarity between two vectors: a vector representing a particular concept, and another vector that represents a context window for the concept. The vector representing a context window for a concept may itself be a mean of vectors associated with concepts in the selected concept window. For example, vectors corresponding to a focus concept's parent and/or children concepts (or grandparent, grandchild, etc.) may be averaged to produce a single vector, which is compared to a vector for the focus concept by calculating the cosine similarity between the two. In an embodiment, the loss function may be represented mathematically according to the relation:

$$\text{Loss}(\text{concept\_focus}) \propto \cos(\text{concept\_focus}, \text{mean}(\text{concepts\_parents\&children}))$$

wherein the output value of the loss function (e.g., "Loss") for a selected concept (e.g., "concept_focus") is directly proportional to the cosine similarity between a vector for the focus concept (e.g., "concept_focus") and a vector that is a mean of vectors for parents and/or children concepts of the focus concept (e.g., "mean(concepts_parents&children)"). The mean vector may be a mean of vectors corresponding to any concepts in a neighboring context window of the focus concept, and may include any combination of parent vectors, children vectors, grandparent vectors, grandchildren vectors, and the like. Proportionality of the loss function to the cosine similarity value may include a multiple of the cosine similarity value, such as 1.5 times the cosine similarity value, three times the cosine similarity value, 0.8 times the cosine similarity value, and the like.

Concept embedding module 150 may randomly initialize values for one or more features of each vector. A vector may include a plurality of dimensions, each of which represent a feature. In some embodiments, vectors are one-hot vectors in which each dimension has a specific meaning; in other embodiments, vectors are dense vectors in which the value for each dimension (and thus feature) is induced from data to capture word and/or concept embeddings in a corpus and/or ontology. The loss function may be optimized by iteratively adjusting the values for each vector in order to minimize the output value of the loss function when a vector is compared to positive training examples, and to maximize the output value for the loss function when a vector is compared to negative training examples. Positive training examples may represent concepts that are related to a focus concept, and negative training examples may represent concepts that are unrelated to a focus concept. In some embodiments, concept embedding module 150 generates positive training examples by selecting vectors that represent parents and/or children of a focus concept, and calculating a mean of the selected vectors. Concept embedding module 150 may generate negative training examples by selecting vectors of concepts that are unrelated (e.g., according to the hierarchical ontology) to the focus concept, and similarly calculating a mean of the selected vectors.

A positive training example may be based on a portion of an ontology. For example, if an ontology includes a concept of "phospholipids" that has a parent concept of "lipids" and child concept of "phosphatidylcholine," then concept embedding module 150 may generate a positive training example by calculating the mean of three vectors: a vector representing the concept of phospholipids, a vector representing the concept of lipids, and a vector representing the concept of phosphatidylcholine. A negative training example may be produced by selecting concepts in a window and substituting one or more of the concepts with an unrelated concept. The unrelated concept may be chosen by randomly selecting a concept that is not already included in the context window. For example, "canines" may be substituted with "phospholipids" to form a negative training example of lipids/canines/phosphatidylcholine. As the concept of canines does not logically fit in an ontological position between phospholipids and phosphatidylcholine, this example is considered a poor representation of the relatedness of these concepts, and is thus useful as a negative training example.

Concept embedding module 150 may iteratively adjust the values of the set of vectors representing concepts in an ontology until a desired level of convergence is attained. In some embodiments, concept embedding module 150 applies lexical pressure by combining concept embedding information with word embedding information when a surface form of a concept has non-ambiguous, well-embedded text representations (e.g., in a corpus). Surface forms for a concept may be identified in an ontology, and may include any terms for the concept, including synonyms and terms from different vocabularies. Concept embedding module 150 may identify non-ambiguous, well embedded text representations by determining that a surface form meets certain criteria. One criterion may include a term appearing in a document or corpus of documents a threshold number of times, such as thirty times. Surface forms may be excluded from consideration if they occur in multiple incompatible concepts, such as concepts that have different semantic types. For example, if a surface form is linked to a concept belonging to the semantic type "eukaryotes" and is also linked to another concept belonging to the semantic type "educational activity," this surface form would be excluded as being potentially ambiguous. Additionally or alternatively, concept embedding module 150 may exclude surface forms that are short acronyms (e.g., below a threshold number of characters).

When concept embedding module 150 has identified a non-ambiguous, well-embedded text representation of a surface form for a concept, concept embedding module 150 may utilize a loss function to apply lexical pressure to the concept's vector during training. In an embodiment, the loss function may be represented mathematically according to the relation:

$$\text{Loss(concept\_focus)} \propto \cos(\text{concept\_focus}, \text{mean}(\text{concepts\_parents\&children})) + \cos(\text{concept\_focus}, \text{mean}(\text{words\_concept}))$$

wherein the loss function is directly proportional to both the cosine similarity of a concept's vector and vectors of neighboring concepts as well as the cosine similarity of the concept's vector and a mean of word vectors that correspond to other words (e.g., "mean(words_concept)") that appear in a same context as the focus word in a corpus. Proportionality of the loss function to the cosine similarity value may include a multiple of the cosine similarity value, such as 1.5 times the cosine similarity value, three times the cosine similarity value, 0.8 times the cosine similarity value, and the like. Thus, optimizing the loss function may encourage concepts to be embedded in a space that aligns with an existing word embedding space. Concept embedding module 150 may output a vector space model comprising a concept hierarchy that combines concept vectors and word vectors, providing the ability to look up words around a concept as well as concepts around a word. In particular, the vector space model may be used to identify words that are related to a concept by identifying any word vectors that are closest to the concept vector in terms of cosine similarity. Similarly, the vector space model can be used to identify concepts that are related to a word by identifying concept vectors that are closet to the word vector using a cosine similarity metric. For example, the vector space model may be provided with a query of a particular concept to return results that identify the top five closest words based on the cosine similarities of their corresponding vectors.

Concept disambiguation module 145 can collect and maintain user-specific concept metrics for users or groups of users corresponding to user devices 105A-N based on embodiments of method 200 of FIG. 2, which is discussed below. The user-specific concept metrics generated by concept disambiguation module 145 can be stored in storage 160 in some embodiments of the invention. Concept disambiguation module 145 can also, based on identification of message that includes an ambiguous concept from any of user devices 105A-N by NLP module 155, perform concept disambiguation based on the user-specific concept metrics that are collected by concept disambiguation module 145 based on embodiments of method 300 of FIG. 3, which is discussed below. Concept disambiguation module 145 can perform concept disambiguation based on concept embedding data that is determined by concept embedding module 150.

NLP module 155 may perform any appropriate natural language processing tasks using vector space models that are generated by concept embedding module 150. For example, NLP module 155 may utilize a vector space model to perform tasks such as topic recognition, sentiment analysis, question answering, machine translation, word sense disambiguation, and the like.

Storage 160 may include any non-volatile storage media known in the art. For example, storage 160 can be implemented with a tape library, optical library, one or more independent hard disk drives, or multiple hard disk drives in a redundant array of independent disks (RAID). Similarly, data in storage 160 may conform to any suitable storage architecture known in the art, such as a file, a relational database, an object-oriented database, and/or one or more tables. Storage 160 may store data relating to developing vector space models and/or performing natural language processing, including one or more lexical corpora, one or more ontologies of concepts, vector representations of concept embeddings and/or word embeddings, user-specific concept metrics, and the like.

Network 165 may include a local area network (LAN), a wide area network (WAN) such as the Internet, or a combination of the two, and includes wired, wireless, or fiber optic connections. In general, network 165 can be any combination of connections and protocols known in the art that will support communications between user devices 105A-N and NLP server 135 via their respective network interfaces in accordance with embodiments of the present invention.

It is to be understood that the block diagram of FIG. 1 is not intended to indicate that the system 100 is to include all of the components shown in FIG. 1, Rather, the system 100 can include any appropriate fewer or additional components not illustrated in FIG. 1 (e.g., additional user devices, network connections, databases, memory components, embedded controllers, functional blocks, connections between functional blocks, modules, inputs, outputs, etc.). Further, the embodiments described herein with respect to system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
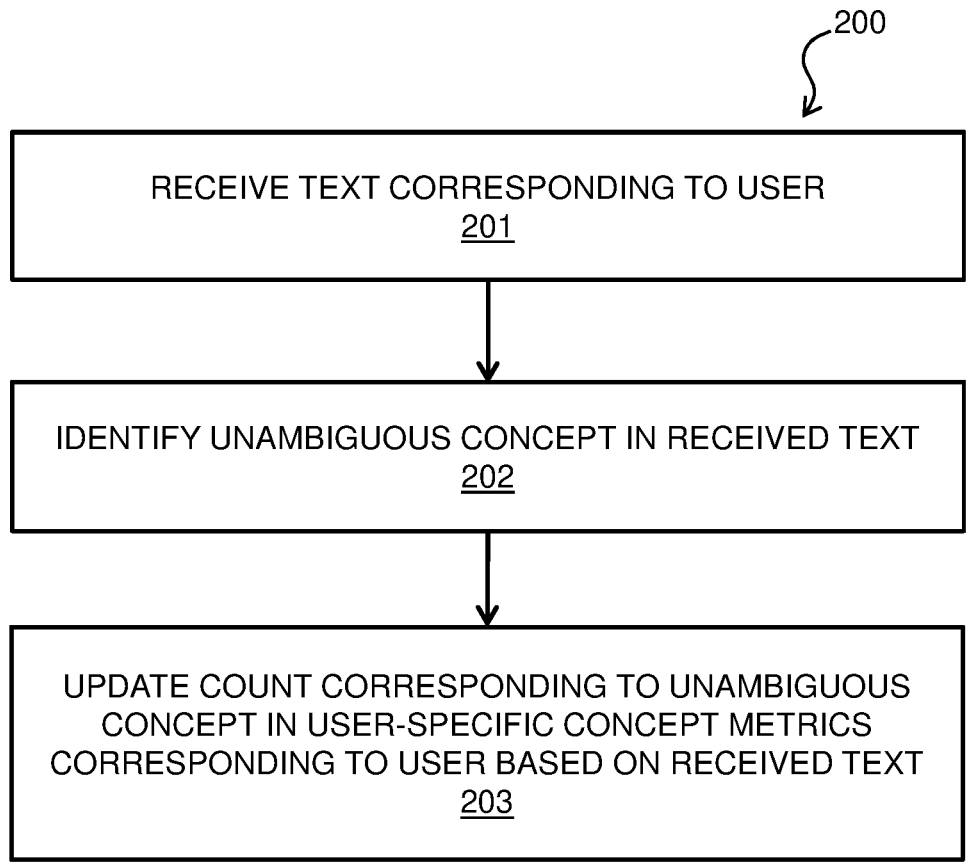
FIG. 2 is a flow diagram of a process for concept disambiguation for natural language processing in accordance with one or more embodiments of the present invention.

FIG. 2 shows a process flow diagram of a method 200 for concept disambiguation for natural language processing in accordance with one or more embodiments of the present invention. Embodiments of method 200 of FIG. 2 can be implemented in conjunction with concept disambiguation module 145 of system 100 of FIG. 1. In block 201 of method 200, text is received corresponding to a user. The text may be any appropriate text that was generated by or is associated with the user. The text of block 201 can be received from any appropriate source (including but not limited to a corpus of text associated with a user or group of users, or messages from any of user devices 105A-N that are associated with the user or group of users) by NLP server 135, and can be processed by NLP module 155.

In block 202, an unambiguous concept is identified in the received text. The unambiguous concept can be identified by NLP module 155, and may be identified in any appropriate manner. For example, the message of block 201 may be a relatively long message (e.g., longer than a threshold length) such that context for the unambiguous concept can be determined from the message in some embodiments, or the unambiguous concept may be clearly stated in the message (e.g., the text spells out "physical therapy" instead of using associated acronym "PT"). The unambiguous concept may be identified based on the unambiguous concept being included in a hierarchical ontology in some embodiments of the invention.

In block 203, a count corresponding to the unambiguous concept is updated in user-specific concept metrics associated with the received text by concept disambiguation module 145. The user-specific concept metrics may be associated with an individual user or with a group of users that includes the user that generated the text (e.g., a tenant) in various embodiments of the invention. The user-specific concept metrics can be partitioned and maintained by concept disambiguation module 145 in any appropriate manner, including but not limited to by tenant, user, organization, subgroup, application, or any other system grouping. Examples of portions of user-specific concept metrics that can be generated according to embodiments of method 200 of FIG. 2 are illustrated with respect to FIGS. 5A-B. Method 200 can be repeated throughout operation of system 100, and can be triggered whenever text including an unambiguous concept is received from any user by NLP server 135. A count corresponding to any unambiguous concept that is encountered in text corresponding to a particular user or group of users can be incremented in the user-specific concept metrics whenever the unambiguous concept is encountered, according to method 200 of FIG. 2.

The process flow diagram of FIG. 2 is not intended to indicate that the operations of the method 200 are to be executed in any particular order, or that all of the operations of the method 200 are to be included in every case. Additionally, the method 200 can include any suitable number of additional operations.

Figure 3:
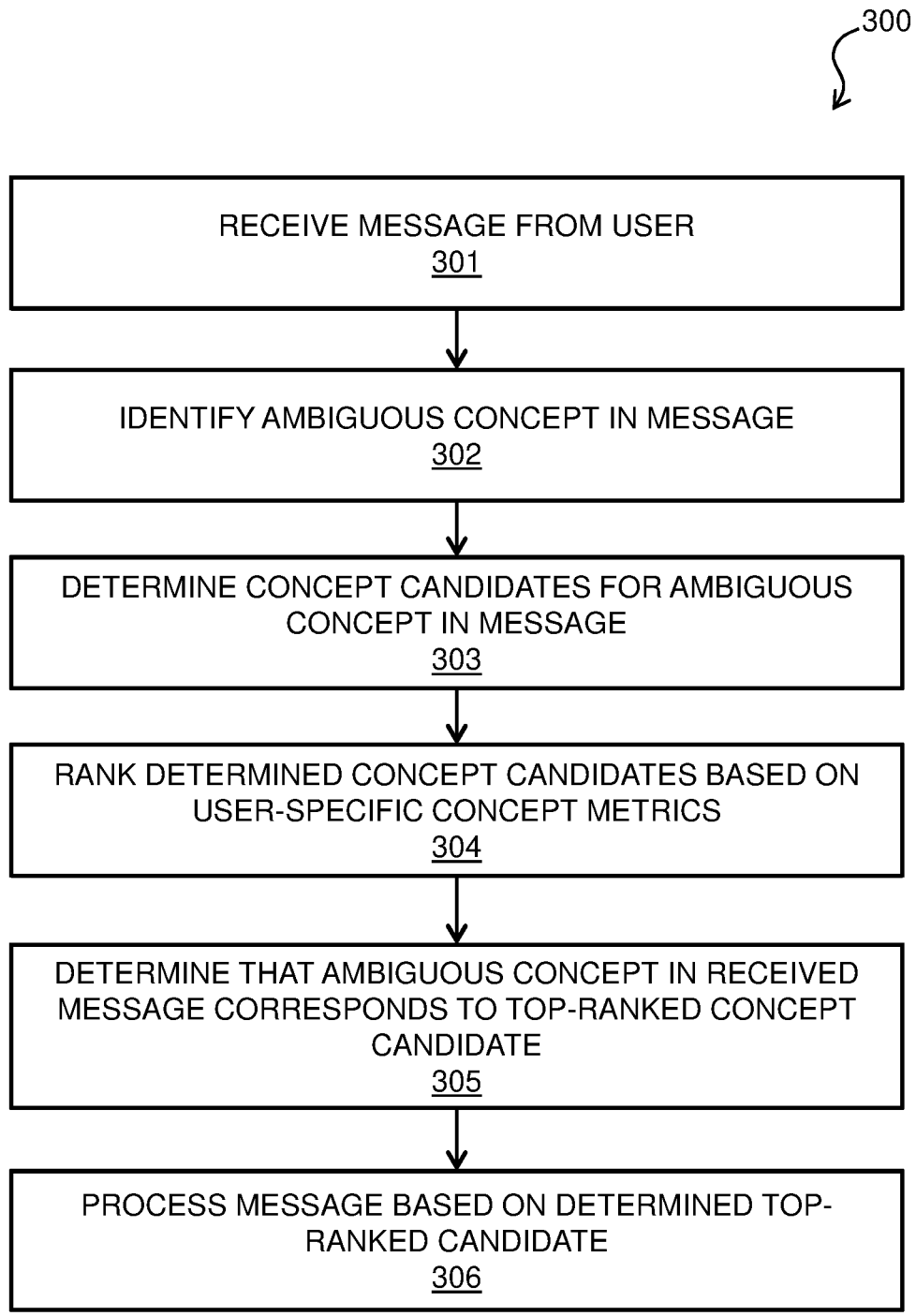
FIG. 3 is a flow diagram of a process for concept disambiguation for natural language processing in accordance with one or more embodiments of the present invention.

FIG. 3 shows a process flow diagram of a method 300 for concept disambiguation for natural language processing in accordance with one or more embodiments of the present invention. Embodiments of method 300 of FIG. 3 can be implemented in conjunction with concept disambiguation module 145 of system 100 of FIG. 1, In block 301 of method 300, a message is received from a user. The message can be received from any of user devices 105A-N of system 100 of FIG. 1, and can be received by NLP server 135. The message can include a query in some embodiments of the invention. In block 302, an ambiguous concept is identified in the message that was received in block 301. The ambiguous concept can be identified by NLP module 155. In some embodiments of the invention, the ambiguous concept may be identified based on the message that was received in block 301 being shorter than a threshold length, such that the message does not include sufficient context for the ambiguous concept. The threshold length may be about 15 words in some embodiments. In some embodiments of the invention, the ambiguous concept that is identified in block 302 can include any acronym (e.g., "PT") or word (e.g., "sterile" or "aspiration") that has multiple possible meanings.

In block 303, concept candidates corresponding to the ambiguous concept are identified by concept disambiguation module 145. The concept candidates can be identified based on a concept, hierarchy in some embodiments. For example, the ambiguous concept may include a string that is located in multiple entries in the concept hierarchy; related concepts to the entries including the string may be selected as concept candidates in block 303. An example of a concept hierarchy that may be used in block 303 is illustrated with respect to FIG. 4B. Any appropriate number of concept candidates corresponding to the ambiguous concept can be determined in block 303.

In block 304, the identified concept candidates from block 303 are ranked based on the user-specific concept metrics that were generated according to method 200 of FIG. 2 by concept disambiguation module 145. The user-specific concept metrics can include a set of unambiguous concepts that have been encountered in text corresponding to the user or group of users, and a respective count of how many times each unambiguous concept has been encountered in text corresponding to the user or group of users. In some embodiments of the invention, a similarity score can be determined for each concept, candidate with respect to each unambiguous concept included in the user-specific concept metrics. In some embodiments of the invention, each determined similarity score can be weighted according to the count corresponding to the respective unambiguous concept, such that similarity to more frequently used unambiguous concepts may result in a higher similarity score. The similarity scores can be determined based on a hierarchical ontology in some embodiments of the invention, and may be determined in any appropriate manner, including but not limited to cosine similarity, a frequency weighted cosine, or a learned approach.

In block 305, the ambiguous concept is disambiguated by determining that the ambiguous concept corresponds to the top-ranked concept candidate (e.g., the concept candidate having the highest determined similarity score) that was determined in block 304 by concept disambiguation module 145. In block 306, the message text including the disambiguated concept is processed by NLP module 155 based on the determined top-ranked candidate. For example, the message text including the disambiguated concept may be used to query a knowledge base and provide information from the knowledge base back to the user that sent the message in block 306. Method 300 of FIG. 3 can be repeated throughout operation of system 100 of FIG. 1, and may be triggered whenever a message is received that includes an ambiguous concept. Example embodiments of method 300 of FIG. 3 are illustrated with respect to FIGS. 5A-B and Tables 1-4 below.

The process flow diagram of FIG. 3 is not intended to indicate that the operations of the method 300 are to be executed in any particular order, or that all of the operations of the method 300 are to be included in every case. Additionally, the method 300 can include any suitable number of additional operations.

Figure 4A:
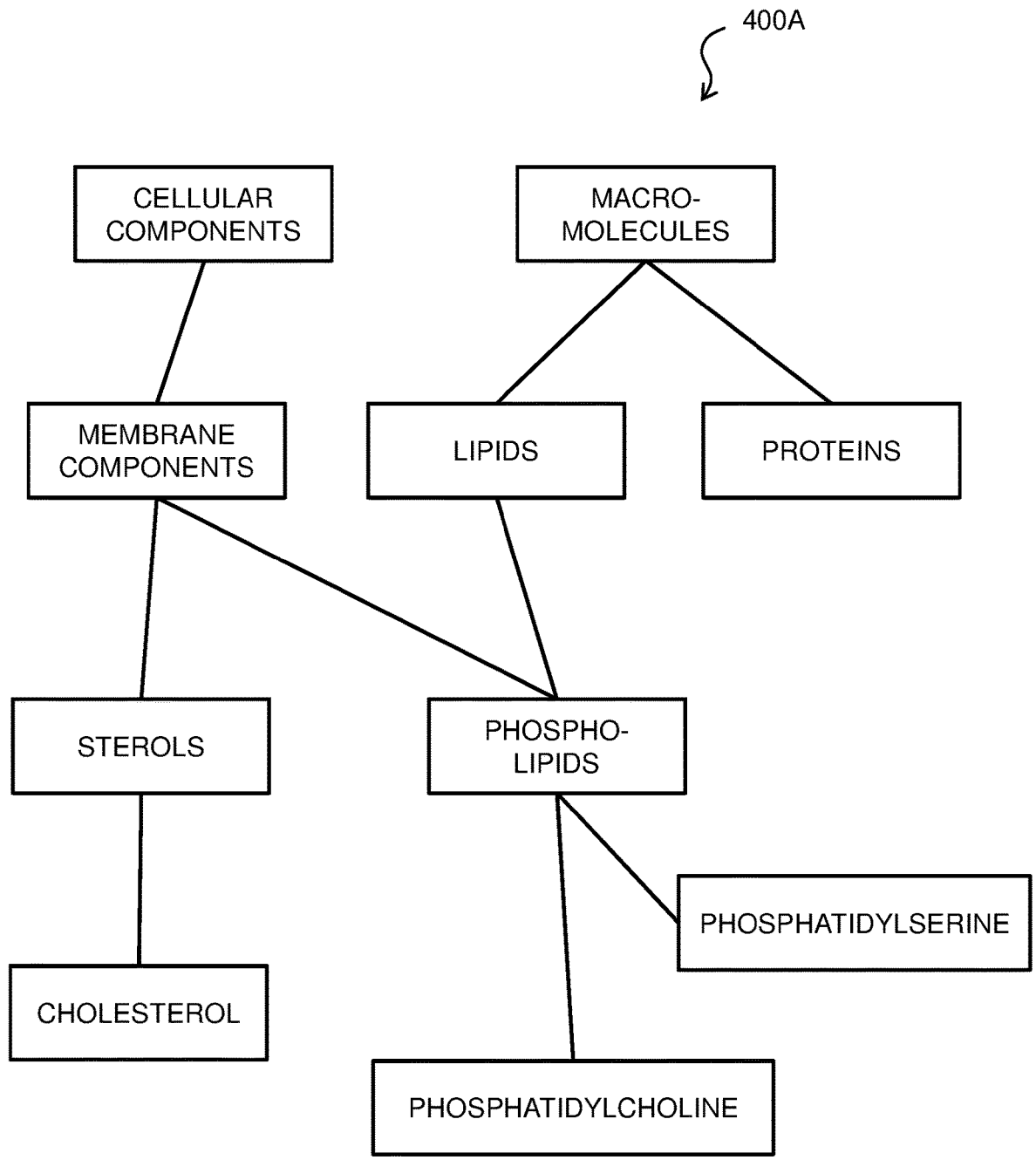
FIG. 4A is a block diagram depicting a portion of a hierarchical ontology in accordance with an embodiment of the present invention.

FIG. 4A is a block diagram depicting a portion of a hierarchical ontology 400A in accordance with an embodiment of the present invention. As depicted, the portion of a hierarchical ontology 400A includes concepts that are linked to each other. Each link may indicate a relationship between two concepts, and each concept may be placed at a particular hierarchical level to establish parent and child concepts for a selected concept. For example, the concept "phospholipids" has two child concepts "phosphatidylcholine" and "phosphatidylserine," and has two parent concepts, "membrane components" and "lipids."

Figure 4B:
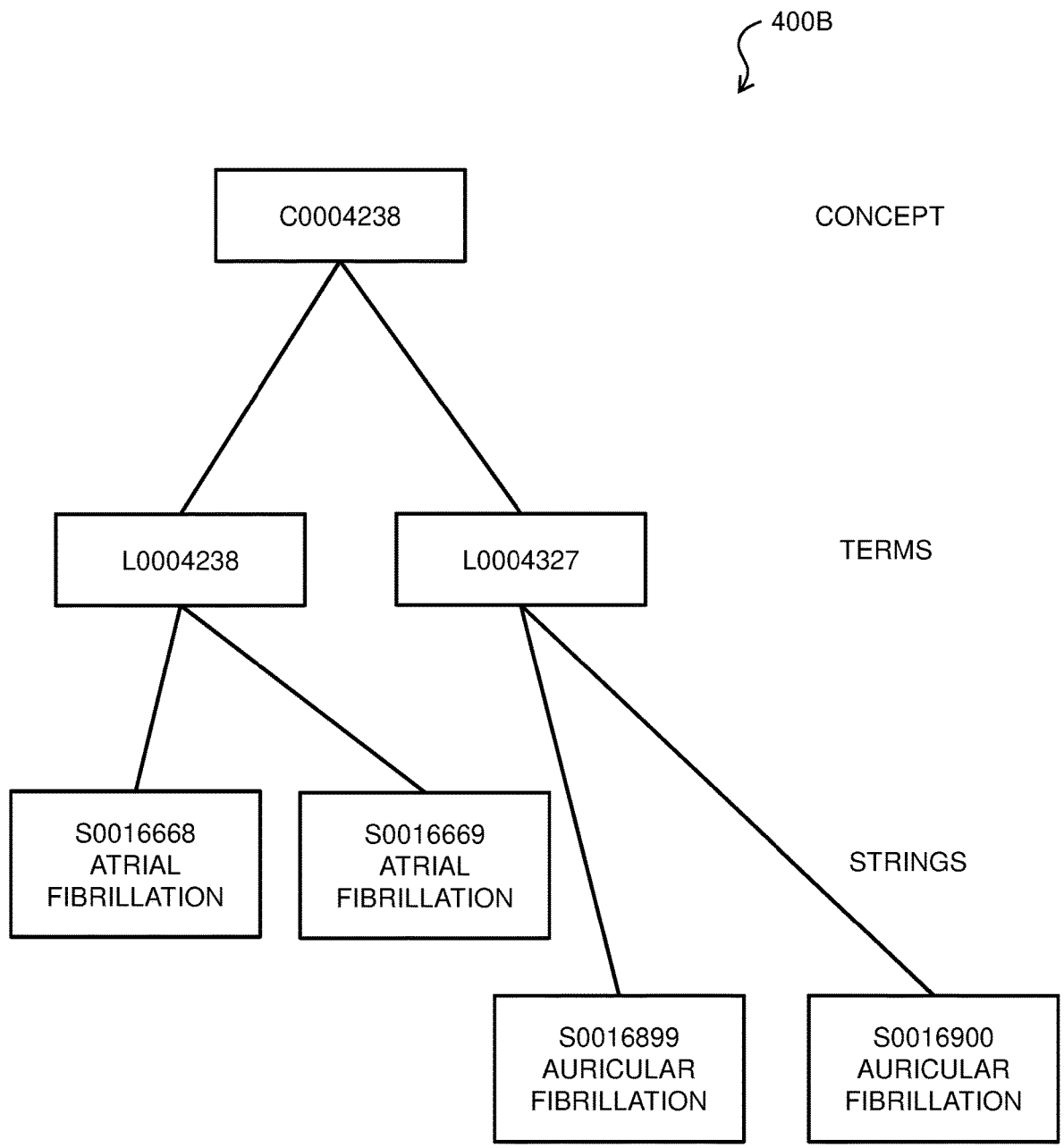
FIG. 4B is a block diagram depicting a portion of a concept hierarchy in accordance with an embodiment of the present invention.

FIG. 4B is a block diagram depicting a portion of a concept hierarchy 400B in accordance with an embodiment of the present invention. As depicted, the portion of a concept hierarchy 400B includes a concept, terms associated with the concept, and strings associated with the terms.

Each concept in an ontology may be assigned a unique identifier, and similar words or phrases for the concept may be grouped in the concept hierarchy according to terms that are also assigned unique identifiers. For example, the concept "C0004238" may refer to a specific form of fibrillation that occurs in the atrium of a heart. Strings for this concept include atrial fibrillation and atrial fibrillations, which are assigned to the term "L0004238," and auricular fibrillation and auricular fibrillations, which are assigned to the term "L0004327." Each string may thus represent a particular surface form for a concept in the concept hierarchy.

FIGS. 4A-B are shown for illustrative purposes only. Embodiments of a hierarchical ontology as shown in FIG. 4A can include any appropriate number and types of concepts that are represented and linked in any appropriate manner. Embodiments of a concept hierarchy as shown in FIG. 4B can include any appropriate number and types of concepts, terms, and strings that are represented and linked in any appropriate manner.

Figure 5A:
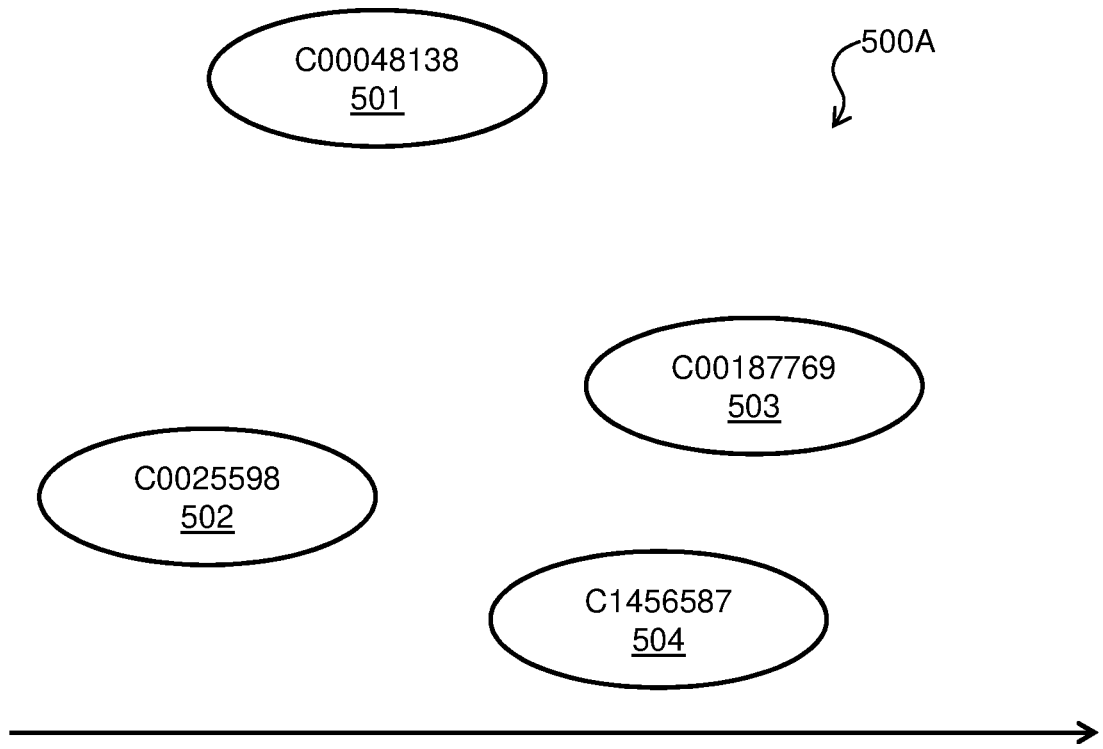
FIG. 5A is a block diagram depicting user-specific concept metrics in accordance with an embodiment of the present invention.
Figure 5B:
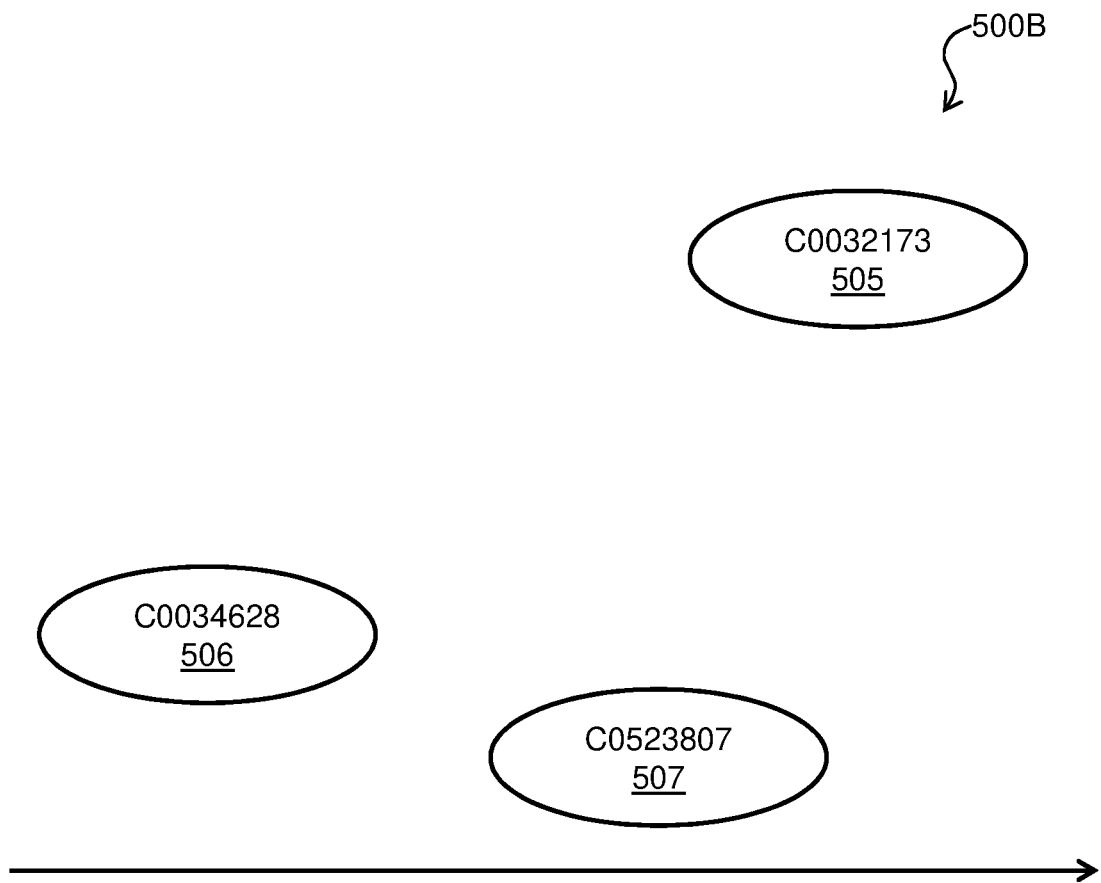
FIG. 5B is a block diagram depicting user-specific concept metrics in accordance with an embodiment of the present invention.

FIGS. 5A-B are block diagrams depicting user-specific concept metrics 500A-B in accordance with embodiments of the present invention. User-specific concept metrics 500A includes concept metrics corresponding to a particular user or group of users (e.g., a tenant, organization, or subgroup of an organization), and user-specific concept metrics 500B includes concept metrics corresponding to a different particular user or group of users. As shown in FIG. 5A, text including unambiguous references to concepts 501-504 has been received and processed for the user or group of users associated with user-specific concept metrics 500A, according to method 200 of FIG. 2. Concepts included in user-specific concept metrics 500A can be assigned identifiers based on a concept hierarchy, such as concept hierarchy 400B of FIG. 4B. As illustrated in FIG. 5A, concept 501 corresponds to "Chiropractic therapy", and has been referenced 10 times; concept 502 corresponds to "Metformin", and has been referenced 2 times; concept 503 corresponds to "ACL surgery", and has been referenced 3 times; and concept 504 corresponds to "bariatric surgery", and has been referenced 4 times.

Based on a message being received from a user that is associated with user-specific concept metrics 500A that includes the acronym "PT" in block 301 of method 300 of FIG. 3, the acronym "PT" can be identified in block 302 and processed as an ambiguous concept according to method 300 of FIG. 3 based on user-specific concept metrics 500A. Concept candidates corresponding to "PT" may be identified, including "physical therapy" and "prothrombin time", in block 303 of method 300. The concept candidates can be identified based on a concept hierarchy, such as concept hierarchy 400B of FIG. 4B, in some embodiments of the invention. In block 304, each of the concept candidates that was determined in block 303 is evaluated based on user-specific concept metrics 500A. For example, a similarity score can be computed for concept candidate "physical therapy" for each of concepts 501-504 in user-specific concept metrics 500A, as illustrated in Table 1:

TABLE 1

Similarity scores for C0949766 (physical therapy)

1. Chiropractic therapy (C0008138): 0.56548
2. Metformin (C0025598): 0.1035
3. ACL surgery (C0187769): 0.4994
4. Bariatric surgery (C1456587): 0.4913

A similarity score can also be computed for concept candidate "prothrombin time" for each of concepts 501-504 in user-specific concept metrics 500A, as illustrated in Table 2:

TABLE 2

Similarity scores for C0033707 (prothrombin time)

1. Chiropractic therapy (C0008138): 0.0517
2. Metformin (C0025598): 0.0696
3. ACL surgery (C0187769): 0.169
4. Bariatric surgery (C1456587): −0.039

The similarity scores illustrated by Tables 1 and 2 may be determined based on the respective counts of the unambiguous concepts and a hierarchical ontology such as hierarchical ontology 400A of FIG. 4A in some embodiments of the invention. In the example illustrated by Tables 1 and 2, the similarity score that is used for the comparison of block 304 is a cosine similarity. A frequency weighted cosine or a learned approach can be implemented in some embodiments of block 304 of method 300 of FIG. 3, As illustrated by Tables 1 and 2, "physical therapy" has a higher similarity score with respect to the frequently used concepts (particularly "Chiropractic therapy" and "ACL surgery") included in user-specific concept metrics 500A than "prothrombin time". Therefore, it is determined that "PT" in the message means "physical therapy" in block 305, and the message is processed accordingly in block 306 of method 300.

Turning to FIG. 5B, text including unambiguous references to concepts 505-507 has been received and processed for the user or group of users associated with user-specific concept metrics 500B, according to method 200 of FIG. 2. Concepts included in user-specific concept metrics 500B can be assigned identifiers based on a concept hierarchy, such as concept hierarchy 400B of FIG. 4B. As illustrated in FIG. 5B, concept 505 corresponds to "Platelet activation", and has been referenced 1 time; concept 506 corresponds to "Radial fractures", and has been referenced 3 times; and concept 507 corresponds to "Oxygen saturation", and has been referenced 4 times.

Based on a message being received from a user associated with user-specific concept metrics 500B that includes the acronym "PT" in block 301 of method 300, the acronym "PT" can be identified in block 302 and processed as an ambiguous concept according to method 300 of FIG. 3 based on user-specific concept metrics 500B. Concept candidates corresponding to "PT" may be identified, including "physical therapy" and "prothrombin time", in block 303 of method 300. The concept candidates can be identified based on a concept hierarchy, such as concept hierarchy 400B of FIG. 4B, in some embodiments of the invention. In block 304, each of the concept, candidates that was determined in block 303 is evaluated based on user-specific concept metrics 500B. For example, a similarity score can be computed for concept candidate "physical therapy" for each of concepts 505-507 in user-specific concept metrics 500B, as illustrated in Table 3:

TABLE 3

Similarity scores for C0949766 (physical therapy)

1. Platelet activation (C0032173): 0.056
2. Radial fractures (C0034628): 0.1369
3. Oxygen saturation (C0523807): 0.097

A similarity score can also be computed for concept candidate "prothrombin time" for each of concepts 505-507 in user-specific concept metrics 500B, as illustrated in Table 4:

TABLE 4

Similarity scores for C0033707 (prothrombin time)

1. Platelet activation (C0032173): 0.639
2. Radial fractures (C0034628): 0.136
3. Oxygen saturation (C0523807): 0.097

The similarity scores illustrated by Tables 3 and 4 may be determined based on the respective counts of the unambiguous concepts and a hierarchical ontology such as hierarchical ontology 400A of FIG. 4A in some embodiments of the invention. In the example illustrated by Tables 3 and 4, the similarity score that is used for the comparison of block 304 is a cosine similarity. A frequency weighted cosine or a learned approach can be implemented in some embodiments of block 304 of method 300 of FIG. 3, As illustrated by Tables 3 and 4, "prothrombin time" has a higher similarity score with respect to the frequently used concepts (particularly "Platelet activation") included in user-specific concept metrics 500B as compared to "physical therapy". Therefore, it is determined that "PT" in the message means "prothrombin time" in block 305, and the message is processed accordingly in block 306.

FIGS. 5A-B are shown for illustrative purposes only. Embodiments of a user-specific concept metrics as shown in FIGS. 5A-B can include any appropriate number and types of concepts and accompanying metrics that are represented in any appropriate manner.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the send ee. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
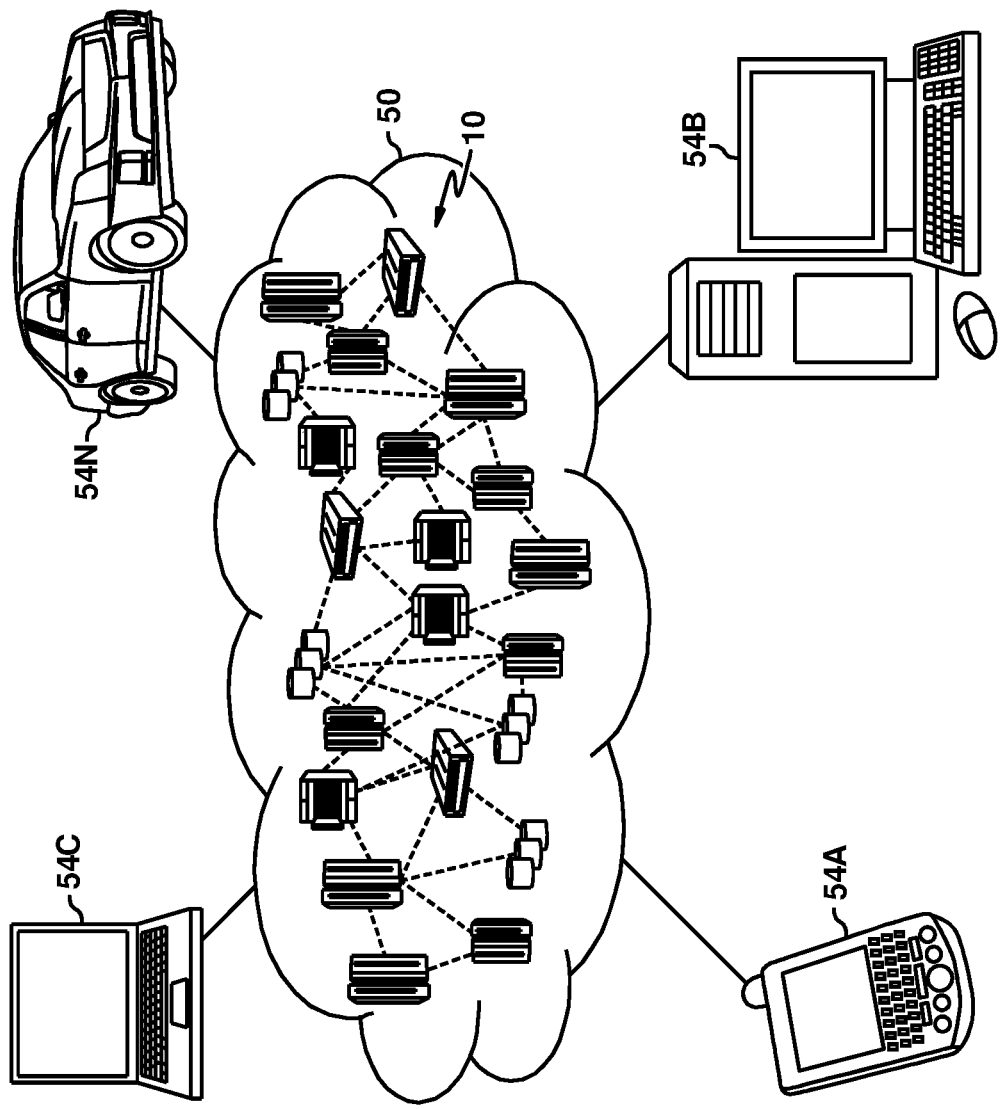
FIG. 6 depicts a cloud computing environment according to an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
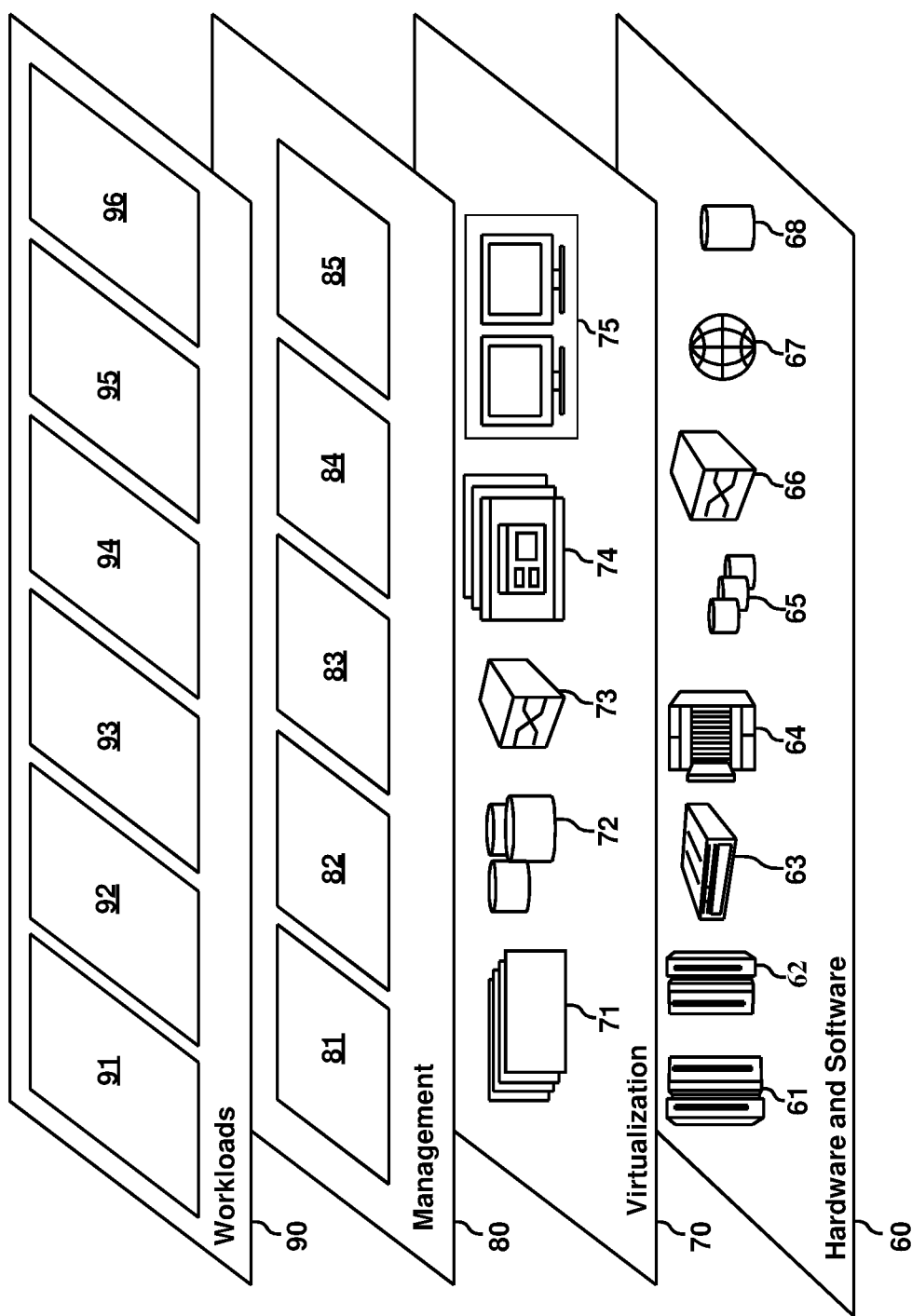
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described herein. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94, transaction processing 95; and NLP service 96, NLP service 96 can implement any appropriate aspects of embodiments of NLP server 135 of FIG. 1, and can implement embodiments of method 200 of FIG. 2 and method 300 of FIG. 3.

Figure 8:
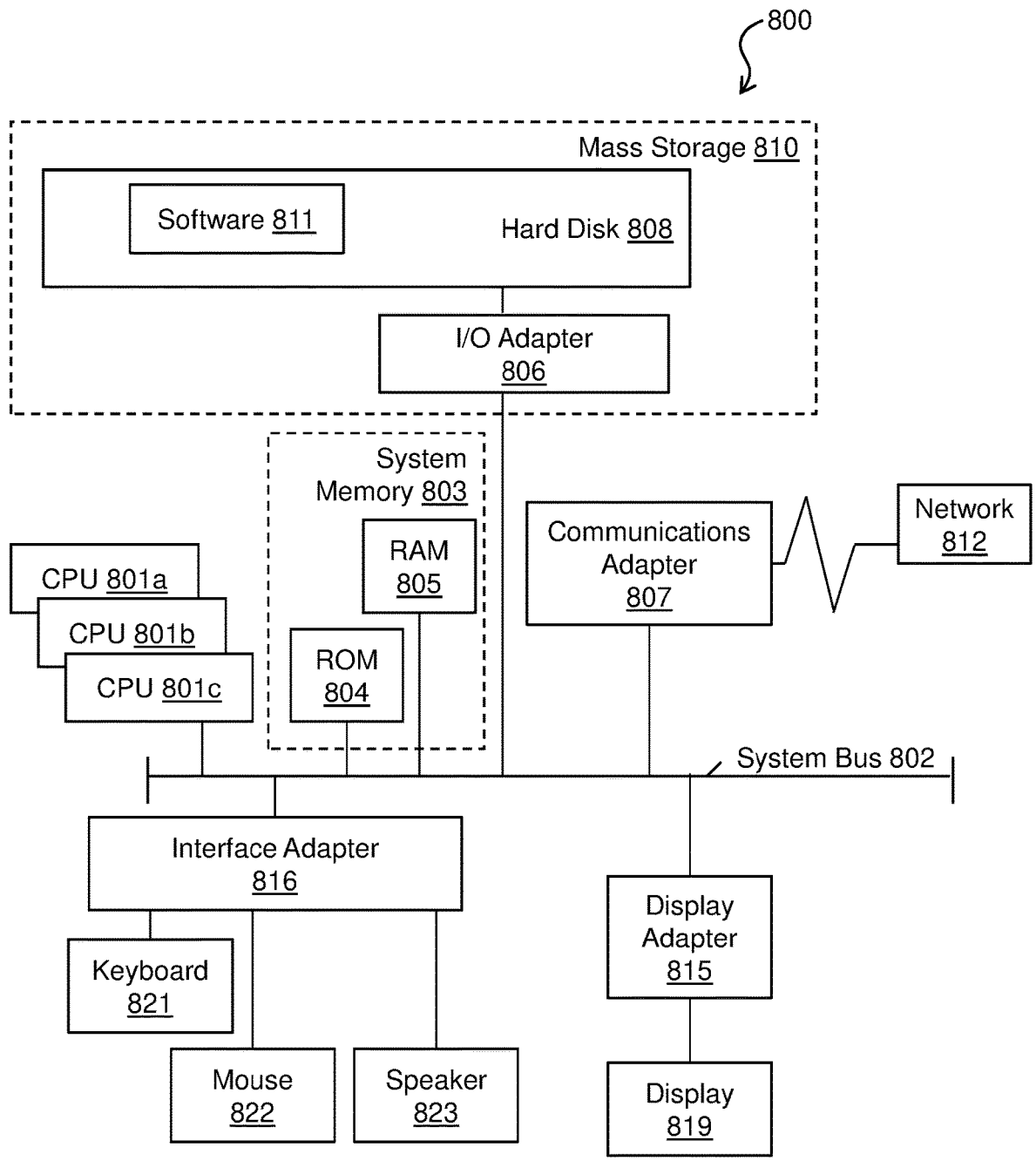
FIG. 8 is a block diagram of an example computer system for use in conjunction with one or more embodiments of concept disambiguation for natural language processing.

Turning now to FIG. 8, a computer system 800 is generally shown in accordance with an embodiment. The computer system 800 can be an electronic, computer framework comprising and/or employing any number and combination of computing devices and networks utilizing various communication technologies, as described herein. The computer system 800 can be easily scalable, extensible, and modular, with the ability to change to different services or reconfigure some features independently of others. The computer system 800 may be, for example, a server, desktop computer, laptop computer, tablet computer, or smartphone. In some examples, computer system 800 may be a cloud computing node. Computer system 800 may be described in the general context of computer system executable instructions, such as program modules, being executed by a computer system. Generally, program modules may include routines, programs, objects, components, logic, data structures, and so on that perform particular tasks or implement particular abstract data types. Computer system 800 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, the computer system 800 has one or more central processing units (CPU(s)) 801a, 801b, 801c, etc, (collectively or generically referred to as processor(s) 801). The processors 801 can be a single-core processor, multi-core processor, computing cluster, or any number of other configurations. The processors 801, also referred to as processing circuits, are coupled via a system bus 802 to a system memory 803 and various other components. The system memory 803 can include a read only memory (ROM) 804 and a random access memory (RAM) 805. The ROM 804 is coupled to the system bus 802 and may include a basic input/output system (BIOS), which controls certain basic functions of the computer system 800. The RAM is read-write memory coupled to the system bus 802 for use by the processors 801. The system memory 803 provides temporary memory space for operations of said instructions during operation. The system memory 803 can include random access memory (RAM), read only memory, flash memory, or any other suitable memory systems.

The computer system 800 comprises an input/output (I/O) adapter 806 and a communications adapter 807 coupled to the system bus 802. The I/O adapter 806 may be a small computer system interface (SCSI) adapter that communicates with a hard disk 808 and/or any other similar component. The I/O adapter 806 and the hard disk 808 are collectively referred to herein as a mass storage 810.

Software 811 for execution on the computer system 800 may be stored in the mass storage 810. The mass storage 810 is an example of a tangible storage medium readable by the processors 801, where the software 811 is stored as instructions for execution by the processors 801 to cause the computer system 800 to operate, such as is described herein with respect to the various Figures. Examples of computer program product and the execution of such instruction is discussed herein in more detail. The communications adapter 807 interconnects the system bus 802 with a network 812, which may be an outside network, enabling the computer system 800 to communicate with other such systems. In one embodiment, a portion of the system memory 803 and the mass storage 810 collectively store an operating system, which may be any appropriate operating system, such as the z/OS or AIX operating system from IBM Corporation, to coordinate the functions of the various components shown in FIG. 8.

Additional input/output devices are shown as connected to the system bus 802 via a display adapter 815 and an interface adapter 816 and. In one embodiment, the adapters 806, 807, 815, and 816 may be connected to one or more I/O buses that are connected to the system bus 802 via an intermediate bus bridge (not shown). A display 819 (e.g., a screen or a display monitor) is connected to the system bus 802 by a display adapter 815, which may include a graphics controller to improve the performance of graphics intensive applications and a video controller. A keyboard 821, a mouse 822, a speaker 823, etc. can be interconnected to the system bus 802 via the interface adapter 816, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 8, the computer system 800 includes processing capability in the form of the processors 801, and, storage capability including the system memory 803 and the mass storage 810, input means such as the keyboard 821 and the mouse 822, and output capability including the speaker 823 and the display 819.

In some embodiments, the communications adapter 807 can transmit data using any suitable interface or protocol, such as the internet small computer system interface, among others. The network 812 may be a cellular network, a radio network, a wide area network (WAN), a local area network (LAN), or the Internet, among others. An external computing device may connect to the computer system 800 through the network 812. In some examples, an external computing device may be an external Webserver or a cloud computing node.

It is to be understood that the block diagram of FIG. 8 is not intended to indicate that the computer system 800 is to include all of the components shown in FIG. 8. Rather, the computer system 800 can include any appropriate fewer or additional components not illustrated in FIG. 8 (e.g., additional memory components, embedded controllers, modules, additional network interfaces, etc.). Further, the embodiments described herein with respect to computer system 800 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted, or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagram s, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart, illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations wall be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
receiving, by a processor via an application, a message from a user;
based on a determination that a length of the message is less than a threshold length, processing the message to identify an ambiguous concept in the message, wherein the length is a number of words in the message and wherein the threshold length is a maximum number of words;
determining a plurality of concept candidates corresponding to the ambiguous concept;
determining, for each of the plurality of concept candidates, a respective similarity score based on user-specific concept metrics corresponding to a group of users that includes the user and to the application used by the user to send the message;
ranking the plurality of concept candidates based on the determined similarity scores; and
determining that the ambiguous concept corresponds to a top-ranked concept candidate of the ranked plurality of concept candidates.

2. The method of claim 1, wherein the user-specific concept metrics comprise a plurality of unambiguous concepts that have been identified in text corresponding to the user, and, for each of the plurality of unambiguous concepts, a respective count.

3. The method of claim 2, wherein each similarity score is determined based on a concept embedding corresponding to a natural language processing service and the respective counts for each of the plurality of unambiguous concepts.

4. The method of claim 1, further comprising processing the message by a natural language processing service based on the top-ranked concept candidate.

5. A system comprising:
a memory having computer readable instructions; and
one or more processors for executing the computer readable instructions, the computer readable instructions controlling the one or more processors to perform operations comprising:
receiving, via an application, a message from a user;
based on a determination that a length of the message is less than a threshold length, processing the message to identify an ambiguous concept in the message, wherein the length is a number of words in the message and wherein the threshold length is a maximum number of words;
determining a plurality of concept candidates corresponding to the ambiguous concept;

determining, for each of the plurality of concept candidates, a respective similarity score based on user-specific concept metrics corresponding to a group of users that includes the user and to the application used by the user to send the message;

ranking the plurality of concept candidates based on the respective similarity scores; and determining that the ambiguous concept corresponds to a top-ranked concept candidate of the ranked plurality of concept candidates.

6. The system of claim 5, wherein the user-specific concept metrics comprise a plurality of unambiguous concepts that have been identified in text corresponding to the user, and, for each of the plurality of unambiguous concepts, a respective count.

7. The system of claim 6, wherein each similarity score is determined based on a concept embedding corresponding to a natural language processing service and the respective counts for each of the plurality of unambiguous concepts.

8. The system of claim 5, the operations further comprising processing the message by a natural language processing service based on the top-ranked concept candidate.

9. A computer program product comprising a computer readable storage medium having program instructions embodied therewith, the program instructions executable by one or more processors to cause the one or more processors to perform operations comprising:

receiving a message from a user;

based on a determination that a length of the message is less than a threshold length, processing the message to identify an ambiguous concept in the message, wherein the length is a number of words in the message and wherein the threshold length is a maximum number of words;

determining a plurality of concept candidates corresponding to the ambiguous concept;

determining, for each of the plurality of concept candidates, a respective similarity score based on user-specific concept metrics corresponding to a group of users that includes the user and to the application used by the user to send the message;

ranking the plurality of concept candidates based on the respective similarity scores; and determining that the ambiguous concept corresponds to a top-ranked concept candidate of the ranked plurality of concept candidates.

10. The computer program product of claim 9, wherein the user-specific concept metrics comprise a plurality of unambiguous concepts that have been identified in text corresponding to the user, and, for each of the plurality of unambiguous concepts, a respective count.

11. The computer program product of claim 10, wherein each similarity score is determined based on a concept embedding corresponding to a natural language processing service and the respective counts for each of the plurality of unambiguous concepts.

12. The computer program product of claim 9, wherein the user-specific concept metrics correspond to a group of users that includes the user that sent the message.

13. A computer-implemented method comprising:

receiving, by a processor from an application, text corresponding to a first user;

identifying an unambiguous concept in the text corresponding to the first user;

incrementing a count corresponding to the unambiguous concept in user-specific concept metrics corresponding to the first user, wherein the user-specific concept metrics correspond to a group of users that includes the first user;

receiving a message, wherein the message is received from one of a second user of the group of users and an instance of the application;

based on a determination that a length of the message is less than a threshold length, wherein the threshold length is a maximum number of words, processing the message to identify an ambiguous concept in the message;

determining a plurality of concept candidates corresponding to the ambiguous concept;

determining, for each of the plurality of concept candidates, a respective similarity score based on the user-specific concept metrics and to the application used by the user to send the text;

ranking the plurality of concept candidates based on the respective similarity scores; and determining that the ambiguous concept corresponds to a top-ranked concept candidate of the ranked plurality of concept candidates.

14. A system comprising:

a memory having computer readable instructions; and one or more processors for executing the computer readable instructions, the computer readable instructions controlling the one or more processors to perform operations comprising:

receiving, from an application, text corresponding to a first user;

identifying an unambiguous concept in the text corresponding to the first user;

incrementing a count corresponding to the unambiguous concept in user-specific concept metrics corresponding to the first user, wherein the user-specific concept metrics correspond to a group of users that includes the first user and to the application used by the user to send the text;

receiving a message, wherein the message is received from one of a second user of the group of users and an instance of the application;

based on a determination that a length of the message is less than a threshold length wherein the threshold length is a maximum number of words, processing the message to identify an ambiguous concept in the message;

determining a plurality of concept candidates corresponding to the ambiguous concept;

determining, for each of the plurality of concept candidates, a respective similarity score based on the user-specific concept metrics;

ranking the plurality of concept candidates based on the respective similarity scores; and determining that the ambiguous concept corresponds to a top-ranked concept candidate of the ranked plurality of concept candidates.

* * * * *